United States Patent
Lu et al.

(10) Patent No.: US 12,217,256 B2
(45) Date of Patent: Feb. 4, 2025

(54) SCALING TRANSACTIONS WITH SIGNAL ANALYSIS

(71) Applicant: International Business Machines Corporation, Armonk, NY (US)

(72) Inventors: Shuyan Lu, Cary, NC (US); Yi-Hui Ma, Mechanicsburg, PA (US); Eugene Irving Kelton, Wake Forest, NC (US); John H. Walczyk, III, Raleigh, NC (US); Brandon Harris, Union City, NJ (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 17/064,627

(22) Filed: Oct. 7, 2020

(65) Prior Publication Data

US 2022/0107813 A1    Apr. 7, 2022

(51) Int. Cl.
*G06Q 20/38* (2012.01)
*G06F 9/38* (2018.01)
(Continued)

(52) U.S. Cl.
CPC ......... *G06Q 20/389* (2013.01); *G06F 9/3836* (2013.01); *G06F 9/466* (2013.01);
(Continued)

(58) Field of Classification Search
CPC ... G06Q 20/389; G06Q 20/4015–4016; G06Q 20/405; G06Q 20/40; G06F 9/3836; G06F 9/4418; G06F 9/466; G06F 17/14
See application file for complete search history.

(56) References Cited

U.S. PATENT DOCUMENTS 10,827,039 B1 * 11/2020 Dandekar ............... H04L 69/04
2006/0116920 A1    6/2006 Shan
(Continued)

FOREIGN PATENT DOCUMENTS

CN        110197374      *  9/2019
WO        02046474 A3       6/2002

OTHER PUBLICATIONS

Tianqing, Zhu, "Suspicious Financial Transaction Detection Based on Empirical Mode Decomposition Method", Proceedings of the 2006 IEEE Asia-Pacific Conference on Services Computing (APSCC'06), © 2006 IEEE, 5 pages.
(Continued)

*Primary Examiner* — Eric T Wong
(74) *Attorney, Agent, or Firm* — Stosch Sabo; Andrew D. Wright; Calderon Safran & Wright P.C.

(57) ABSTRACT

Embodiments of the present invention provide a computer system, a computer program product, and a method that comprises determining a pattern within received data based on a periodicity associated with the received data; in response to a calculated signal score associated with the determined pattern of the received data meeting or exceeding a predetermined threshold transaction amount, tracing at least one location associated with the received data; and dynamically suspending an action associated with an account that generated the received data in response to the traced location not being associated with a historical baseline of the account.

20 Claims, 5 Drawing Sheets

(51) Int. Cl.
*G06F 9/46* (2006.01)
*G06F 17/14* (2006.01)
*G06Q 20/40* (2012.01)

(52) U.S. Cl.
CPC ......... *G06F 17/14* (2013.01); *G06Q 20/4015* (2020.05); *G06Q 20/4016* (2013.01); *G06Q 20/405* (2013.01)

(56) References Cited

U.S. PATENT DOCUMENTS

| | | | |
|---|---|---|---|
| 2006/0212487 A1 | 9/2006 | Kennis | |
| 2007/0061211 A1 | 3/2007 | Ramer | |
| 2009/0018798 A1* | 1/2009 | Dorneich | G06F 17/18 702/179 |
| 2011/0055072 A1* | 3/2011 | Lee | G06Q 40/03 705/38 |
| 2011/0055852 A1* | 3/2011 | Smith | G06Q 40/08 719/318 |
| 2011/0131122 A1* | 6/2011 | Griffin | G06Q 40/00 705/35 |
| 2011/0251951 A1* | 10/2011 | Kolkowitz | G06Q 40/02 705/39 |
| 2013/0036037 A1* | 2/2013 | Meredith | G06Q 40/00 705/35 |
| 2015/0039512 A1 | 2/2015 | Adjaoute | |
| 2015/0178825 A1 | 6/2015 | Huerta | |
| 2015/0317281 A1 | 11/2015 | Sharifi et al. | |
| 2017/0011382 A1 | 1/2017 | Zoldi | |
| 2017/0364851 A1* | 12/2017 | Maheshwari | G06Q 10/06314 |
| 2018/0293377 A1* | 10/2018 | Tomonaga | G06F 21/552 |
| 2018/0351786 A1* | 12/2018 | Pope | H04L 67/34 |
| 2019/0259033 A1* | 8/2019 | Reddy | G06N 5/02 |
| 2019/0311367 A1* | 10/2019 | Reddy | G06Q 20/4016 |
| 2019/0349426 A1 | 11/2019 | Smith | |
| 2021/0312450 A1* | 10/2021 | Allbright | G06F 7/24 |
| 2022/0050728 A1* | 2/2022 | Foster, II | G06F 9/505 |
| 2022/0215006 A1 | 7/2022 | Lu | |
| 2022/0215278 A1 | 7/2022 | Lu | |
| 2022/0237516 A1* | 7/2022 | Schmidt | G06N 5/022 |

OTHER PUBLICATIONS

Lu et al., "Vector Alignment of Signal Lag", U.S. Appl. No. 17/140,192, filed Jan. 4, 2021, 24 pages.
Lu et al., "Removal of Transaction Noise", U.S. Appl. No. 17/140,203, filed Jan. 4, 2021, 23 pages.
Appendix P—List of IBM Patents or Patent Applications Treated as Related, Filed herewith, 2 Pages.
Non-Final Office Action dated Apr. 3, 2024 in related U.S. Appl. No. 17/140,192, 24 pages.

* cited by examiner

SCALING TRANSACTIONS WITH SIGNAL ANALYSIS

BACKGROUND

The present invention relates generally to the field of data pipeline technology, and more specifically data cleaning technology within data pipeline technology.

A data pipeline is a series of steps that moves data through a process. The output of a preceding step in the process becomes the input of the subsequent step. Data, typically raw data, goes in one side, goes through a series of steps, and then pops out the other end ready for use or already analyzed. The steps of a data pipeline can include cleaning, transforming, merging, modeling, and more, in any combination. Depending on the level of complexity associated with the data, these data pipelines may be simple and may become highly complex.

Data cleaning is the process of detecting and correcting (or removing) corrupt or inaccurate records from a record set, table, or database and refers to identifying incomplete, incorrect, inaccurate or irrelevant parts of the data and then replacing, modifying, or deleting the dirty or coarse data. Data cleansing may be performed interactively with data wrangling tools, or as batch processing through scripting. After cleansing, a data set should be consistent with other similar data sets in the system. The inconsistencies detected or removed may have been originally caused by user entry errors, by corruption in transmission or storage, or by different data dictionary definitions of similar entities in different stores. Data cleaning differs from data validation in that validation almost invariably means data is rejected from the system at entry and is performed at the time of entry, rather than on batches of data.

The actual process of data cleansing may involve removing typographical errors or validating and correcting values against a known list of entities. The validation may be strict (such as rejecting any address that does not have a valid postal code) or fuzzy (such as correcting records that partially match existing, known records.) Some data cleansing solutions will clean data by cross-checking with a validated data set. A common data cleansing practice is data enhancement, where data is made more complete by adding related information. For example, appending addresses with any phone numbers related to that address. Data cleaning may also involve harmonization (or normalization) of data, which is the process of bringing together data of "varying file formats, name conventions, and columns", and transforming it into one cohesive data set; a simple example is the expansion of abbreviations.

SUMMARY

Embodiments of the present invention provide a computer system, a computer program product, and a method that comprises determining a pattern within received data based on a periodicity associated with the received data; in response to a calculated signal score associated with the determined pattern of the received data meeting or exceeding a predetermined threshold transaction amount, tracing at least one location associated with the received data; and dynamically suspending an action associated with an account that generated the received data in response to the traced location not being associated with a historical baseline of the account.

DETAILED DESCRIPTION

Figure 1:
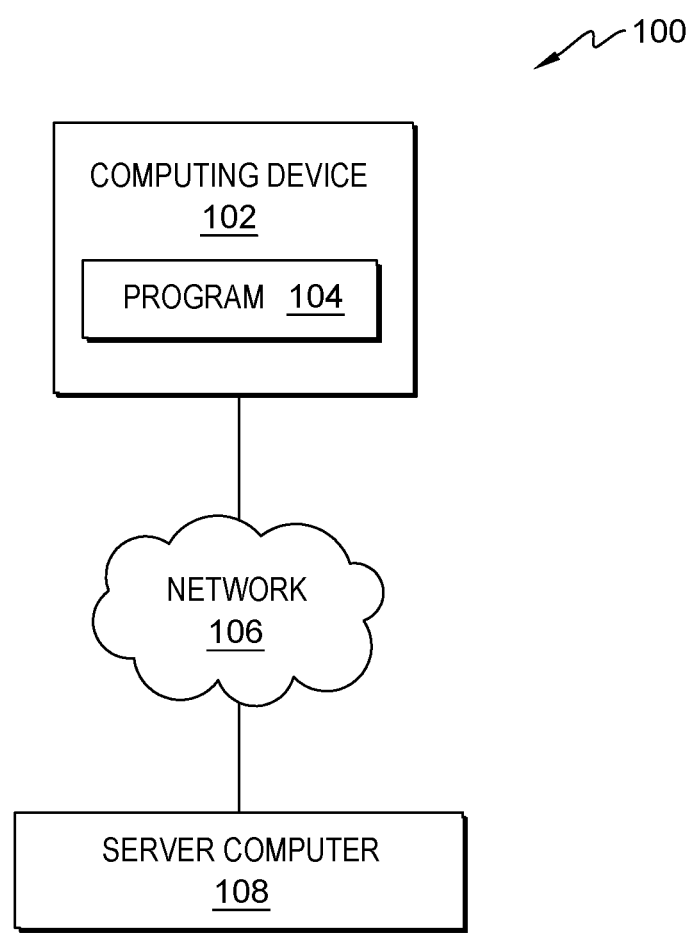
FIG. 1 is a functional block diagram depicting an environment with a computing device connected to or in communication with another computing device, in accordance with at least one embodiment of the present invention.

Embodiments of the present invention recognize the need for an improvement to data cleaning technology systems due to the amount of time and resources needed to clean data that is defined as complex. In this embodiment, complex data is defined as raw data with multiple data points and each data point requiring a generated data pipeline for data cleaning. Current data cleaning technology systems within a financial crime arena regulate, observe, and analyze data transactions for a predetermined amount of time, which exhausts a larger number of resources to regulate, observe, and analyze data transactions for any longer period of time than the predetermined amount of time customarily affixed to these data transactions. Furthermore, data cleaning technology systems lack an ability to identify patterns and determine periodicities of data within an efficient timely manner. Embodiments of the present invention improve the efficiency and lower the cost of current data cleaning technology systems by applying a standard statistical standardization to the data transactions and periodically scaling the statistical standardization by transferring the data transactions from a measure time domain to a measure frequency domain. Embodiments of the present invention improve the efficiency in time and resources of data cleaning technology systems by standardizing a transaction time sequence data to form a transaction signal for use in identifying patterns from the financial transaction time series. The conversion of data include one or more of: 1) standardizing the transaction signal by applying statistical standardization and finding a periodicity; 2) determining a lag between a vector representation of the any two signals using the lag to align vectors to measure the similarity signals, and applying cross-correlation on the two vectors to measure the similarity between the signals; and 3) applying a filter to each converted signal representation of each transaction time sequence data to remove a transaction noise from each discrete converted signal representation. Embodiments of the preset invention improve the efficiency of current data cleaning technology by detecting behavior patterns involving financial transactions amongst entities; standardizing a transaction signal by application statistical standardization to financial transactions; and finding a periodicity of financial transactions. Embodiments of the present invention receive a plurality of transaction time series data for a plurality of transacting entities, each transaction time sequence data being a series of events occurring over different time scales. For each of the plurality of transaction time sequence, embodiments of the present invention convert a transaction time sequence data for transacting entity into a signal representation for input to a fraud detection classification model.

In other embodiments, the present invention provide this improvement to data cleaning technology by plotting a transaction table into a line chart with a transaction amount for a data transaction as a y-axis and a time of transaction associated with the data transaction as a x-axis; determining a periodicity for the data transaction by calculating an auto-covariance of the data transaction, identifying maximums within the calculated auto-covariance, and deducting the periodicity from the calculated auto-covariance based on the identified maximums; in response to determining the periodicity of the data transaction, calculating an overall score by multiplying a number of cycle associated with the data transaction by the determined periodicity of the data transaction; dynamically re-plotting a line chart based on the plotted transaction table using the calculated overall score; and transmitting the dynamically re-plotted line chart to a computing device 102.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 5.

The computing device 102 may include a program 104. The program 104 may be a stand-alone program on the computing device 102. In another embodiment, the program 104 may be stored on a server computing device 108. In this embodiment, the program 104 determines a pattern within transactional data associated with a user by standardizing and converting time based transactional data into frequency based transactional, tracing at least one location of the transactional data, and freezing a completion of the transaction in response to a determined periodicity of the transactional data meeting or exceeding a predetermined threshold transaction amount and transaction frequency. In this embodiment, the program 104 receives data from at least one user, wherein the data is transactional data sent from one user to another user, a corporation, or an entity capable of receiving transactional data. In this embodiment, the program 104 generates a first transaction table that displays the transactional data within a graph. In this embodiment, the program 104 plots the transactional data with a transaction amount as the y-axis and a time associated with the transaction as the x-axis. In this embodiment, the program 104 determines a pattern within the transactional data based on the generated transactional table. In this embodiment, the program 104 determines a periodicity of the transactional data by calculating an auto-covariance of the transactional data, identifying maximums (e.g., peaks) within the transactional data, and deducting the periodicity based on the calculated auto-covariance and identified maximums. In this embodiment, the determined periodicity is defined as a tendency or pattern that is predicted to recur at intervals. In this embodiment and in response to determining the periodicity of the transactional data, the program 104 calculates a signal score by multiplying an identified cycle value by the determined periodicity of the transactional data. In this embodiment, an identified cycle value is based on an amount of time for a data cleaning algorithm to determine the periodicity of the transactional data, where the more complex the transactional data is, the higher the identified cycle value due to a longer amount of time for the data cleaning algorithm. In this embodiment, the program 104 dynamically generates a second transactional table based on the removing of any transactional data that meets or exceeds a predetermined threshold of calculated signal scores, wherein the removal of this data is defined as removing outliers within the transactional data; thus cleaning the transactional data. In this embodiment, the program 104 transmits the generated second transactional table to a server computing device 108 via a network 106.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computing device 108, specifically the program 104 in accordance with a desired embodiment of the invention.

The server computing device 108 may include the program 104 and may communicate with the computing device 102 via the network 106.

Figure 2:
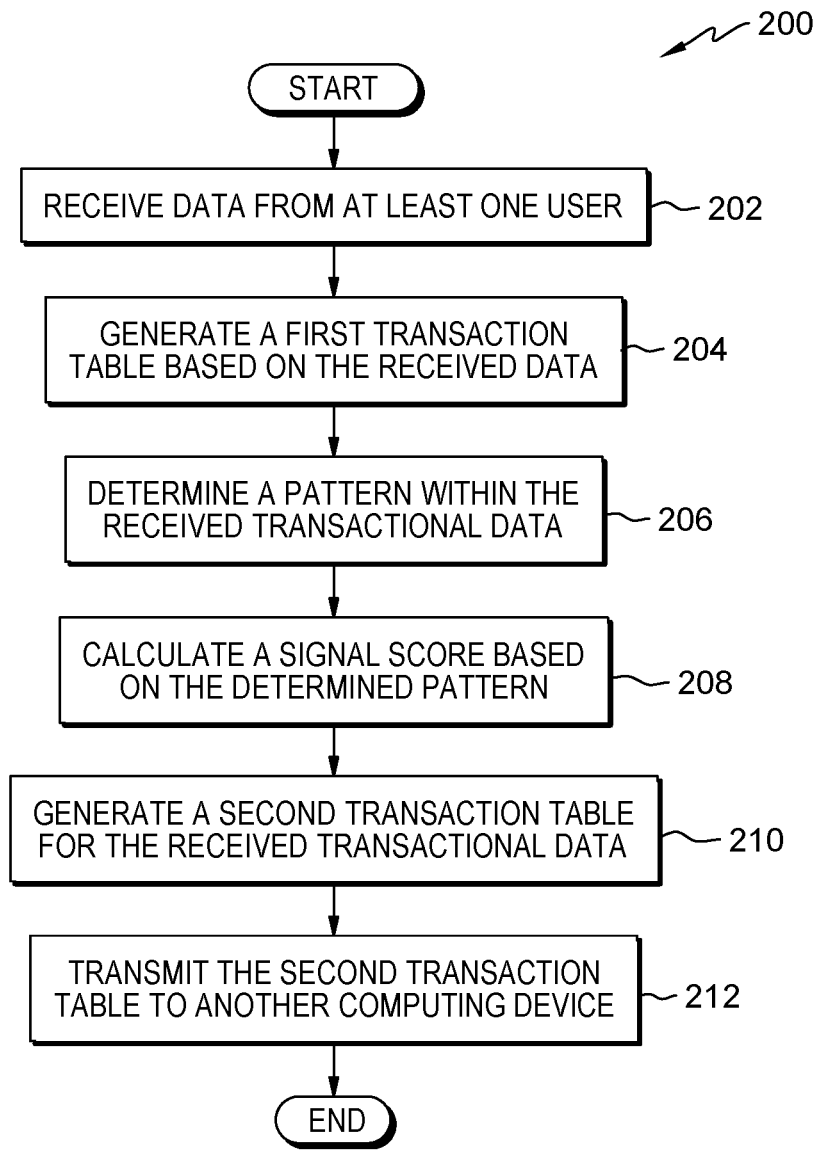
FIG. 2 is a flowchart illustrating operational steps for scaling transactional data using a signal analysis, in accordance with at least one embodiment of the present invention.

FIG. 2 is a flowchart 200 illustrating operational steps for scaling transactional data using a signal analysis algorithm, in accordance with at least one embodiment of the present invention.

In step 202, the program 104 receives data from at least one user. In this embodiment, the program 104 receives transactional data from at least one user in a plurality of users. In this embodiment, the program 104 defines transactional data as data that contains a time dimension which means there is timeliness to it, and over time, it becomes less relevant. In this embodiment, the program 104 receives opt-in/opt-out permission from the user prior to receiving data, where the opt-in/opt-out permission allows a user to terminate permission for the program 104 to receive any data associated with the user at any time. For example, the program 104 receives financial data transmitted from the user to a bank associated with the user, and the data contains an amount transmitted and the time of the transmissions.

In step 204, the program 104 generates a first transaction table based on the received data from the at least one user. In this embodiment, the program 104 generates a line graph based on a first transaction table by plotting the received transactional data, where the amount of the transaction is the y-axis and the time associated with the transaction is the x-axis. In this embodiment, a line graph is a type of chars used to show information that changes over time. For example, the program 104 generates a graph that displays a line graph with y-axis is the amount of transaction measured in U.S. dollars with a range of a minimum value of −$5000 to a maximum value of $20,000; and x-axis is the time associated with the transaction measured in days with a range of 30 days.

In step 206, the program 104 determines a pattern within the received transactional data based on the generated first transaction table. In this embodiment, the program 104 determines a pattern within the received transactional data by determining a periodicity associated with the received transactional data. In this embodiment, the determined periodicity is the calculated frequency of tractions occurring for a user over a concentrated period of time associated with a historical baseline of the account. In this embodiment, the concentrated period of time is defined as a shorter amount of time than the amount of time used to define the x-axis. In this embodiment, the program 104 determines the periodicity associated with the received transactional data by calculating an auto-covariance of the transactional data, identifying maximums (e.g., peaks) within the transactional data, and deducting the periodicity based on the calculated auto-covariance and identified maximums. In this embodiment, the program 104 determines a pattern by standardizing a transactional signal based on the received transactional data. In this embodiment, the program 104 standardizes the transactional signal by applying a statistical standardization to the received transactional data, calculating an auto-covariance to the standardized transactional data, and deducing a periodicity. This step will be further explained in FIG. 3. For example, the program 104 standardizes the number of transactions received by a user over a 3 day period (e.g., concentrated period of time), removes outliers and common transaction, and determines the frequency of transactions over the 3 day period that are not common transactions, thus determining a pattern associated with the user's transactions. In this embodiment, the program 104 calculates an auto-covariance of the transactional data by converting the transactional data from time domain to a frequency domain using a Fourier transform algorithm. In this embodiment, the program 104 initially receives the transactional data based on a measured time variable, such as days, weeks and months. In this embodiment and in response to standardizing the transactional data, the program 104 converts the time measurement to a measurement of frequency, such as transaction volume. Therefore, the program 104 calculates an auto-covariance by converting the transactional data from a time measurement to a frequency measurement. In this embodiment, the program 104 identifies peaks within the calculated auto-variance of the transactional data by detecting a point that meets or exceeds a predetermined threshold of transaction amount, where the predetermined threshold of transaction amount is based on a value that is equal to or greater than an average transaction amount over a concentrated fixed amount of time day period. In this embodiment, the program 104 deduces a periodicity of the transactional data by determining a pattern of identified peaks meeting or exceeding the predetermined threshold of transactional amount over a fixed amount of time within the calculated auto-variance. In this embodiment, the periodicity correlates with the number of identified peaks within the calculated auto-variance. For example, the larger the number of identified peaks within the calculated auto-variance, the higher the periodicity of the calculated auto-variance. In this embodiment, the program 104 determines a pattern based on the received information by determining a transactional volume. In this embodiment, the program 104 calculates the transactional volume associated with a specific user by dividing the number of transactions occurring over a concentrated fixed amount of time. For example, the program 104 traces a destination and origin of a financial transaction in response to determining a transaction volume meets or exceeds the predetermined threshold of transaction amount.

In step 208, the program 104 calculates a signal score based on the determined pattern of the calculated auto-variance of the received transactional data. In this embodiment, the program 104 the calculates the signal score by multiplying a number of identified cycles and the deduced periodicity of the transactional data. based on a calculated strength of the signal of the transactional data. In this embodiment, the calculated signal score is proportional to the strength of the signal within the transactional data. In this embodiment, the program 104 defines an identified cycle as a value based on the amount of time a data cleansing algorithm requires to analyze the received transactional data, wherein the higher the complexity of the received transactional data then the higher the amount of time required by the data cleansing algorithm to analyze the received transactional data. In another embodiment, the program 104 generates a scale for the strength of the signal, where the scale has a range of 1 to 10. In this embodiment, the program 104 classifies calculated signal scores from 1-3 as low strength on the generated scale. In this embodiment, the program 104 classifies calculated signal score from 4-7 as medium strength on the generated scale. In this embodiment, the program 104 classifies calculated signal scores from 8-10 as high strength on the generated scale.

In step 210, the program 104 generates a second transaction table for the received transactional data. In this embodiment, the program 104 generates a second transaction table by generating a line graph removing the transactional data with a low strength classification calculated signal score and re-plotting the remaining transactional data, thereby removing transactional data that meets or exceeds a predetermined threshold of signal strength. In this embodiment, the program 104 re-plots the remaining transactional data by removing outliers in the transactional data with the lowest impact on the calculated signal score. In this embodiment, the program 104 adjusts the y-axis to display an application of a statistical standardization to the transactional amount. In this embodiment, the program 104 adjusts the x-axis to display the periodicity of the transactional amount. In this embodiment, the line graph associated with the second transactional table is a cropped area of the line graph associated with the first transaction table. In this embodiment, the cropped area is defined as a zoomed-in portion of information.

In step 212, the program 104 transmits the second transaction table to another computing device 102. In this embodiment, the program 104 transmits the second transaction table to a user interface on another computing device 102 associated with a different user for display. In this embodiment, the different user may be a corporation, a company, or a bank. In this embodiment, the program 104 allows for a bank to determine whether a user's transaction history raises a suspicion based on predictable and high strength transactions within the transactional data.

In another embodiment, the program 104 traces at least one location associated with the transactional data in response to the calculated signal score meeting or exceeding a predetermined threshold of transaction amount. In this embodiment, the program 104 traces an originating location and a receiving location for each transaction in response to the calculated signal score associated with a specific user meeting or exceeding the predetermined threshold of transaction amount based on the historical baseline associated with the account of the user. In another embodiment, the program 104 traces a plurality of locations associated with the received transactional data associated with the specific user in response to the determined periodicity meeting or exceeding a predetermined threshold of transaction volume. In this embodiment, the program 104 defines location as a physical location and technical location. For example, the program 104 traces the location of the transactional data to an offshore savings account, which is a technical location, and is physically located in the Cayman Islands.

In this embodiment and in response to tracing the location of the transactional data to an uncommon location, the program 104 suspends the transaction until receiving input from the user to proceed with the transaction. In this embodiment, an uncommon location is defined as a location that has not been associated with the user at any time in the past transactional data. In this embodiment, the program 104 may freeze, suspend, or deny the process of the transaction in response to receiving input form the user associated with the transactional data. For example, a user frequently sends domestic transactions; then the program 104 freezes a transaction of an amount that meets or exceeds the predetermined threshold of truncation amount being sent to a European company until the user submits an approval of the transaction.

Figure 3:
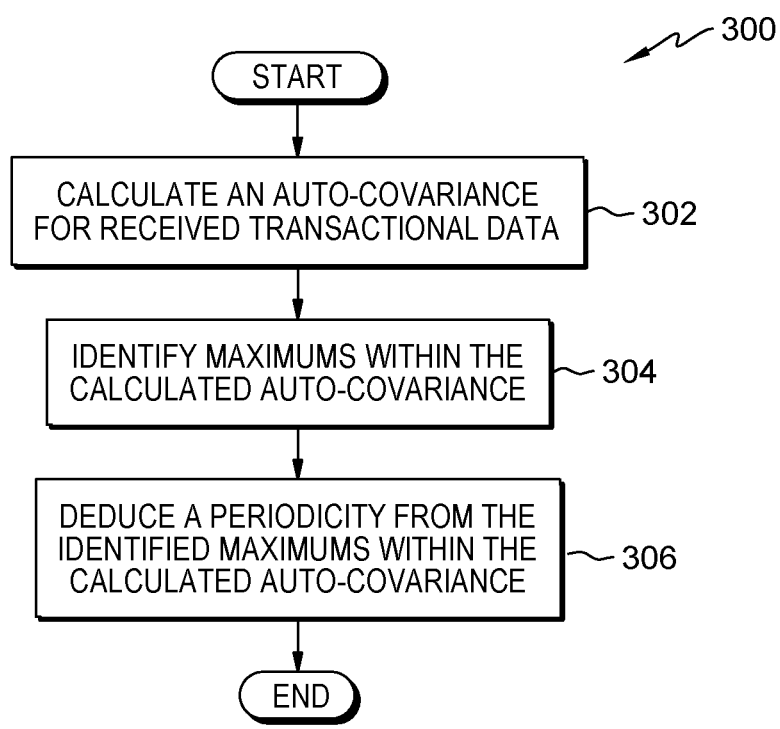
FIG. 3 is a flowchart illustrating operational steps to determine a pattern in the transactional data, in accordance with at least one embodiment of the present invention.

FIG. 3 is a flowchart 300 illustrating operational steps to determine a pattern in the transactional data, in accordance with at least one embodiment of the present invention.

In step 302, the program 104 calculates an auto-covariance for the received transactional data. In this embodiment, the program 104 calculates an auto-covariance for the received transactional data based on the first transaction table by converting the received transactional data from a time domain to a frequency domain. In this embodiment, a time domain is defined as the analysis of mathematical functions, physical signals or time series of economic or environmental data, with respect to time. In this embodiment, a frequency domain is defined as the analytic space in which mathematical functions or signals are conveyed in terms of frequency, rather than time. In this embodiment, the program 104 defines the auto-covariance as a function that automatically measures the joint variability of two random variables, where the greater values of one variable corresponds with the greater values of the other variable, and the same hold for the lesser values. For example, the program 104 receives financial transactions associated with a specific user and calculates an auto-covariance of the received financial transactions as the frequency of transactions within a three-day window.

In step 304, the program 104 identifies maximums within the calculated auto-covariance. In this embodiment, the program 104 identifies maximums, or peaks, within the line graph based on the first transaction table, and these maximums are also the identified maximums or peaks within the calculated auto-covariance. In this embodiment, the program 104 identifies a peak within the calculated auto-covariance based on the received transactional data within a shorter amount of time than the entire x-axis of the first transaction table.

In step 306, the program 104 deduces a periodicity from the identified maximums within the calculated auto-covariance. In this embodiment, the program 104 deduces a periodicity by utilizing the following equation:

$$y_{k+1} = \Sigma_{j=0}^{n-1} w^{jk} x_{j+1} \quad (1)$$

With respect to equation (1), y is defined as the frequency series, k is defined as the wavenumber, which the number of complete waves that fit in an interval, w is defined as the number of samples, j is defined as the square root of −1, and x is defined as the timer series. In this embodiment, the program 104 utilizes equation (1) to transform or convert the received transactional data from a time function to a frequency function. In this embodiment, the program 104 defines the equation as a mathematical transform that decomposes a function into its constituent frequencies. In this embodiment and in response to applying equation to the identified peaks within the calculated auto-covariance, the program 104 deduces the periodicity of the received transactional data. In this embodiment, the program 104 defines the periodicity as the frequency of transmissions meeting or exceeding a predetermined threshold of transactional amount within a fixed amount of time. In another embodiment, the program 104 defines the periodicity as a transactional volume, wherein the transactional volume is based on the number of transactions over a concentrated fixed amount of time. In this embodiment, the program 104 determines a pattern associated with the received transactional data based on the deduced periodicity of the identified peaks within the calculated auto-covariance. For example, the program 104 determines that the wavenumber, k, is 1, the number of samples or transactions, w, identified that exceed the predetermined threshold is 6, and the amount of days or time series, x, is measured as 30, resulting in the determined periodicity, y, as 15. In this embodiment, the program 104 determines that the value of periodicity meets or exceeds a predetermined threshold volume of transaction frequency, thus triggering a trace and suspension of transactions associated with the account.

Figure 4:
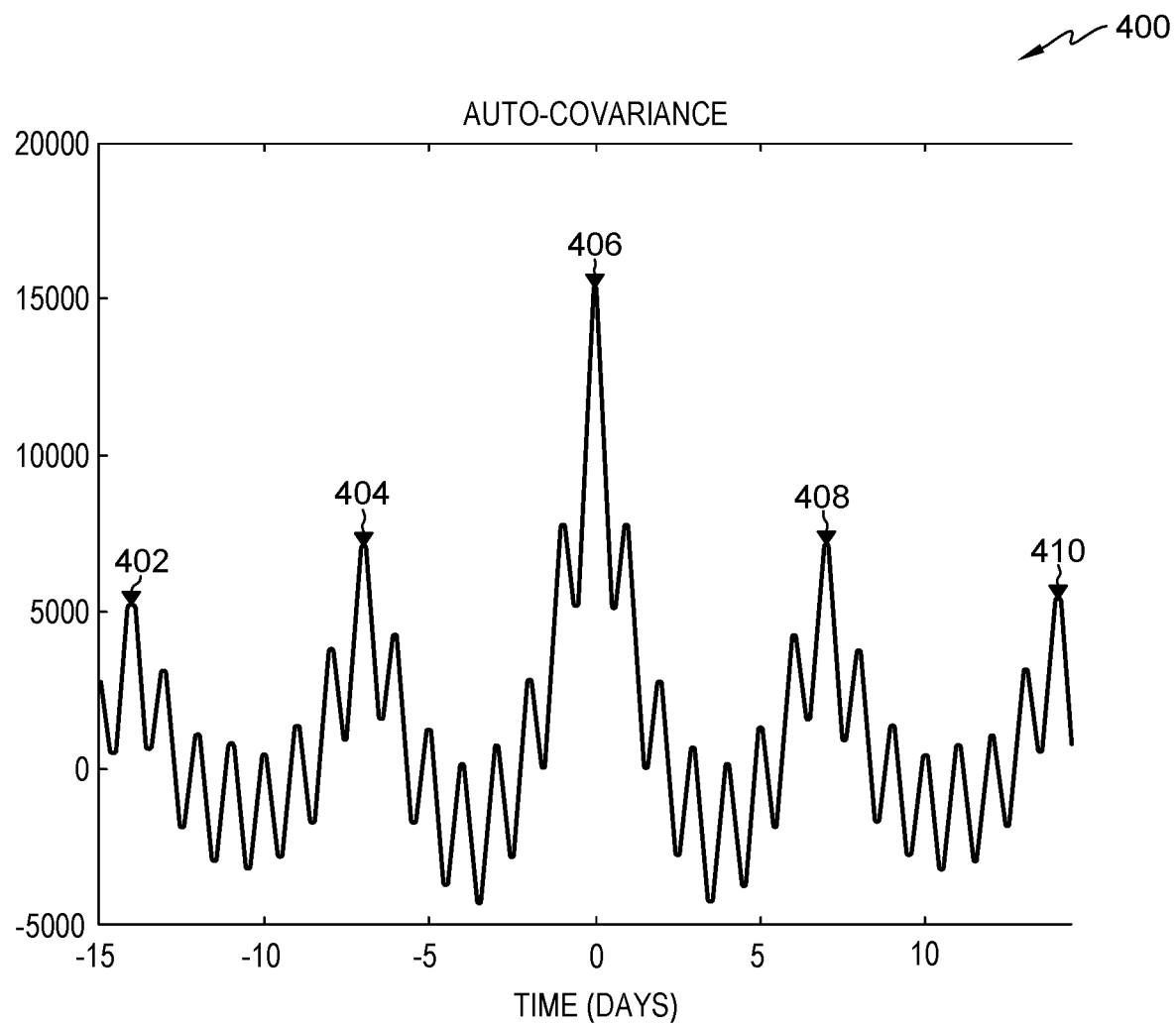
FIG. 4 is an exemplary diagram depicting an example of a standardized transaction, in accordance with at least one embodiment of the present invention.

FIG. 4 is an exemplary line graph 400 illustrating the calculated auto-covariance based on received financial transactions associated with a specific user, in accordance with at least one embodiment of the present invention.

In this embodiment, the x-axis is defined as a measurement of time. For example, days is the measurement used in the example graph 400. In this embodiment, the y-axis is defined as a measurement of the transaction amount in a predetermined currency. For example, the U.S. dollar is the measurement used in the example graph 400. In this embodiment, the identified peaks are marked with downward arrows. In this embodiment, the program 104 identifies peak 402 at 15 days prior to a triggering transaction with an amount that exceeds $5,000. In this embodiment, the program 104 defines the triggering transaction as the transaction that meets or exceeds the predetermined threshold of transactional amount and triggers the program 104 to trace at least one location associated with the transactional data associated with a specific user. In this embodiment, the program 104 identifies peak 404 at 7 days prior to the triggering transaction with an amount that exceeds $7,500. In this embodiment, the program 104 identifies peak 406 as the triggering transaction, the transaction amount exceeds $15,000. In this embodiment, the predetermined threshold of transaction amount is $10,000, thus the identified peak 406 exceeds the threshold transaction amount of $10,000 by $5,000. In this embodiment, the program 104 identifies peak 408 at 8 days past the triggering transaction with an amount that exceeds $7,500. In this embodiment, the program 104 identifies peak 410 at 15 days past the triggering transaction with an amount of $5,000. These identified peaks each have a determined transactional volume that meets or exceeds a predetermined threshold of transaction volume. In this embodiment, the program 104 determines transactional volumes based on received transactional data within a concentrated fixed amount of time, where this fixed amount of time is smaller than the fixed amount of time that is defined as the x-axis. In this embodiment, the example graph 400 depicts the calculated auto-covariance associated with the received transactional data. For example, the program 104 has an x-axis range of 30 days and a y-axis range of $50,000 for transaction amounts.

Figure 5:
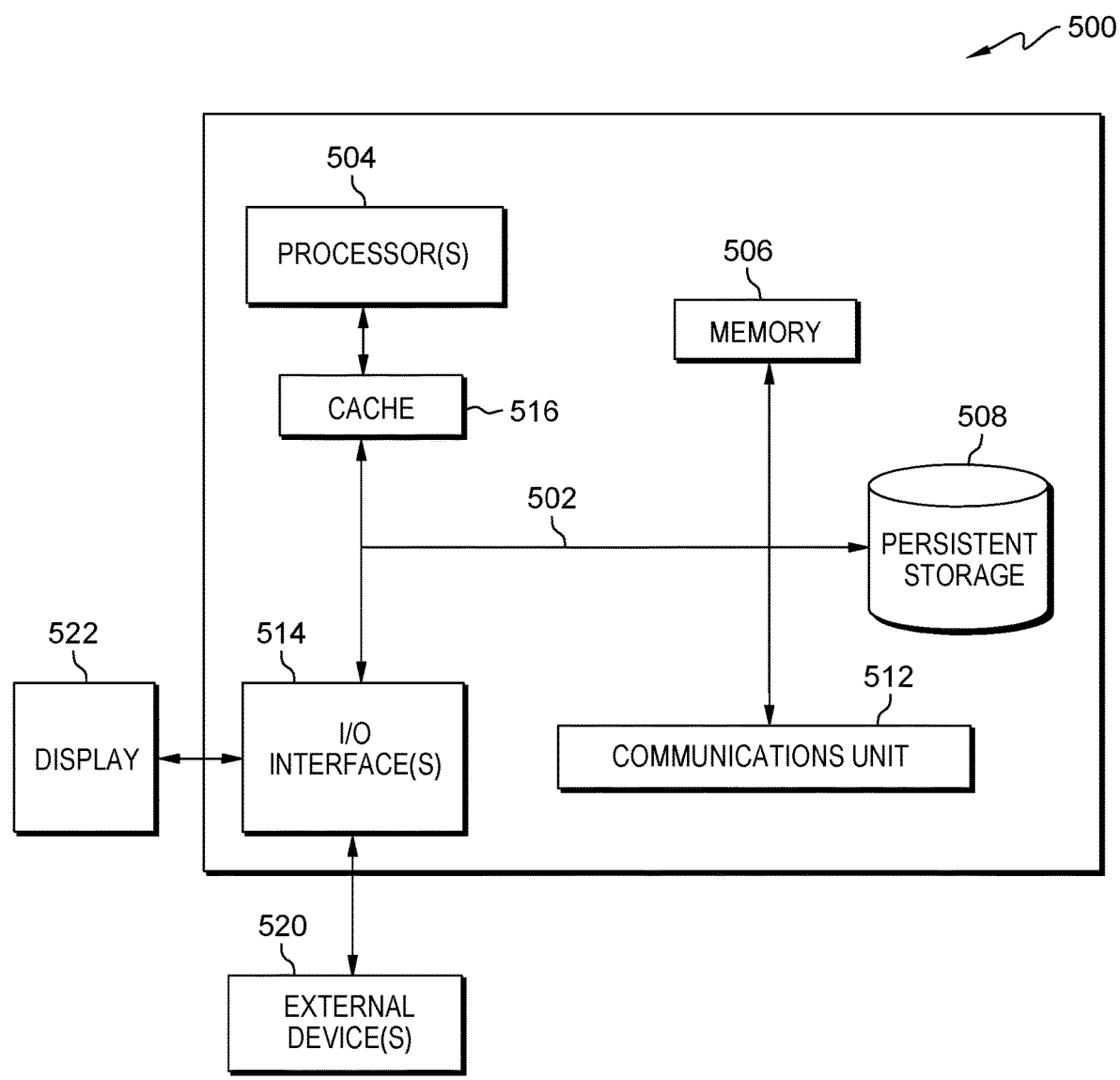
FIG. 5 depicts a block diagram of components of computing systems within a computing display environment of FIG. 1, in accordance with an embodiment of the present invention.

FIG. 5 depicts a block diagram of components of computing systems within a computing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 500 includes a communications fabric 502, which provides communications between a cache 516, a memory 506, a persistent storage 508, a communications unit 512, and an input/output (I/O) interface(s) 514. The communications fabric 502 can be implemented with any architecture designed for passing data and/or control information between processors (such as microprocessors, communications and network processors, etc.), system memory, peripheral devices, and any other hardware components within a system. For example, the communications fabric 502 can be implemented with one or more buses or a crossbar switch.

The memory 506 and the persistent storage 508 are computer readable storage media. In this embodiment, the memory 506 includes random access memory (RAM). In general, the memory 506 can include any suitable volatile or non-volatile computer readable storage media. The cache 516 is a fast memory that enhances the performance of the computer processor(s) 504 by holding recently accessed data, and data near accessed data, from the memory 506.

The program 104 may be stored in the persistent storage 508 and in the memory 506 for execution by one or more of the respective computer processors 504 via the cache 516. In an embodiment, the persistent storage 508 includes a magnetic hard disk drive. Alternatively, or in addition to a magnetic hard disk drive, the persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 508 may also be removable. For example, a removable hard drive may be used for the persistent storage 508. Other examples include optical and magnetic disks, thumb drives, and smart cards that are inserted into a drive for transfer onto another computer readable storage medium that is also part of the persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. The program 104 may be downloaded to the persistent storage 508 through the communications unit 512.

The I/O interface(s) 514 allows for input and output of data with other devices that may be connected to a mobile device, an approval device, and/or the server computing device 108. For example, the I/O interface 514 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 508 via the I/O interface(s) 514. The I/O interface(s) 514 also connect to a display 522.

The display 522 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   transforming, by a processor set, received data from a time function to a frequency function of the received data;
   applying, by the processor set, a filter to the frequency function to remove transactional noise;
   utilizing, by the processor set, a fraud detection classification model to determine a pattern within the received data based on standardizing the received data and a periodicity associated with the frequency function of the received data;
   generating, by the processor set, a signal score associated with the determined pattern of the received data based, at least in part, on an identified cycle value indicative of a complexity of the received data wherein the identified cycle value is based on an amount of time for a data cleaning algorithm to determine the periodicity;
   in response to determining that the generated signal score meets or exceeds a predetermined threshold transaction amount, tracing, by the processor set, at least one location associated with the received data;
   dynamically suspending, by the processor set, a processing of a computer-based transaction associated with an account that generated the received data in response to the traced location not being associated with a historical baseline of the account; and
   in response to receiving a user input, processing, by the processor set, a suspended computer-based transaction.

2. The computer-implemented method of claim 1, wherein determining the pattern comprises:
   calculating an auto-covariance associated with the received data by converting the received data from a time domain to a frequency domain;
   identifying peaks within the calculated auto-covariance associated with the received data, wherein the identified peaks are a maximum amount over a concentrated period of time;
   determining a periodicity of the identified peaks by applying a statistical standardization to the identified peaks within the calculated auto-covariance; and
   determining a pattern associated with the received data based on the determined periodicity of the identified peaks.

3. The computer-implemented method of claim 2, wherein determining the periodicity of the determined pattern comprises:
   converting the received data from the time domain to the frequency domain by applying a Fourier transform algorithm.

4. The computer-implemented method of claim 2, wherein determining the periodicity of the determined pattern comprises:
   tracing at least one location associated with the received data in response to a calculated frequency associated with the received data meeting or exceeding a predetermined threshold of transaction frequency.

5. The computer-implemented method of claim 4, further comprising generating a line graph displaying the calculated auto-covariance and identified peaks of the received data.

6. The computer-implemented method of claim 5, further comprising generating a second line graph by removing received data that does not meet or exceed the predetermined threshold transaction frequency.

7. The computer-implemented method of claim 1, wherein the location is a physical location and a technical location.

8. A computer program product comprising:
one or more computer readable storage media and program instructions stored on the one or more computer readable storage media, the program instructions comprising:
program instructions to transform received data from a time function to a frequency function of the received data;
program instructions to apply a filter to the frequency function to remove transactional noise;
program instructions to utilize a fraud detection classification model to determine a pattern within the received data based on standardizing the received data and a periodicity associated with the frequency function of the received data;
program instructions to generate a signal score associated with the determined pattern of the received data based, at least in part, on an identified cycle value indicative of a complexity of the received data wherein the identified cycle value is based on an amount of time for a data cleaning algorithm to determine the periodicity;
in response to determining that the generated signal score meets or exceeds a predetermined threshold transaction amount, program instructions to trace at least one location associated with the received data;
program instructions to dynamically suspend a processing of a computer-based transaction associated with an account that generated the received data in response to the traced location not being associated with a historical baseline of the account; and
in response to receiving a user input, processing, by the processor set, a suspended computer-based transaction.

9. The computer program product of claim 8, wherein the program instructions to determine the pattern comprise:
program instructions to calculate an auto-covariance associated with the received data by converting the received data from a time domain to a frequency domain;
program instructions to identify peaks within the calculated auto-covariance associated with the received data, wherein the identified peaks are a maximum amount over a concentrated period of time;
program instructions to determine a periodicity of the identified peaks by applying a statistical standardization to the identified peaks within the calculated auto-covariance; and
program instructions to determine a pattern associated with the received data based on the determined periodicity of the identified peaks.

10. The computer program product of claim 9, wherein the program instructions to determine the periodicity of the determined pattern comprise:
program instructions to convert the received data from the time domain to the frequency domain by applying a Fourier transform algorithm.

11. The computer program product of claim 9, wherein the program instructions to determine the periodicity of the determined pattern comprise:
program instructions to trace at least one location associated with the received data in response to a calculated frequency associated with the received data meeting or exceeding a predetermined threshold of transaction frequency.

12. The computer program product of claim 11, wherein the program instructions stored on the one or more computer readable storage media further comprise:
program instructions to generate a line graph displaying the calculated auto-covariance and identified peaks of the received data.

13. The computer program product of claim 12, wherein the program instructions stored on the one or more computer readable storage media further comprise:
program instructions to generate a second line graph by removing received data that does not meet or exceed the predetermined threshold transaction frequency.

14. The computer program product of claim 8, wherein the location is a physical location and a technical location.

15. A computer system comprising:
one or more computer processors;
one or more computer readable storage media; and
program instructions stored on the one or more computer readable storage media for execution by at least one of the one or more processors, the program instructions comprising:
program instructions to transform received data from a time function to a frequency function of the received data;
program instructions to apply a filter to the frequency function to remove transactional noise;
program instructions to utilize a fraud detection classification model to determine a pattern within the received data based on standardizing the received data and a periodicity associated with the frequency function of the received data;
program instructions to generate a signal score associated with the determined pattern of the received data based, at least in part, on an identified cycle value indicative of a complexity of the received data wherein the identified cycle value is based on an amount of time for a data cleaning algorithm to determine the periodicity;
in response to determining that the generated signal score meets or exceeds a predetermined threshold transaction amount, program instructions to trace at least one location associated with the received data;
program instructions to dynamically suspend a processing of a computer-based transaction associated with an account that generated the received data in response to the traced location not being associated with a historical baseline of the account; and
in response to receiving a user input, processing, by the processor set, a suspended computer-based transaction.

16. The computer system of claim 15, wherein the program instructions to determine the pattern comprise:
program instructions to calculate an auto-covariance associated with the received data by converting the received data from a time domain to a frequency domain;
program instructions to identify peaks within the calculated auto-covariance associated with the received data, wherein the identified peaks are a maximum amount over a concentrated period of time;

program instructions to determine a periodicity of the identified peaks by applying a statistical standardization to the identified peaks within the calculated auto-covariance; and program instructions to determine a pattern associated with the received data based on the determined periodicity of the identified peaks.

17. The computer system of claim 16, wherein the program instructions to determine the periodicity of the determined pattern comprise:

program instructions to convert the received data from the time domain to the frequency domain by applying a Fourier transform algorithm.

18. The computer system of claim 16, wherein the program instructions to determine the periodicity of the determined pattern comprise:

program instructions to trace at least one location associated with the received data in response to a calculated frequency associated with the received data meeting or exceeding a predetermined threshold of transaction frequency.

19. The computer system of claim 18, wherein the program instructions stored on the one or more computer readable storage media further comprise:

program instructions to generate a line graph displaying the calculated auto-covariance and identified peaks of the received data.

20. The computer system of claim 19, wherein the program instructions stored on the one or more computer readable storage media further comprise:

program instructions to generate a second line graph by removing received data that does not meet or exceed the predetermined threshold transaction frequency.

* * * * *